US011385828B2

(12) United States Patent
Dong et al.

(10) Patent No.: US 11,385,828 B2
(45) Date of Patent: Jul. 12, 2022

(54) METHOD AND APPARATUS FOR CALCULATING STORAGE SYSTEM AVAILABLE CAPACITY

(71) Applicant: Huawei Technologies Co., Ltd., Shenzhen (CN)

(72) Inventors: Ruliang Dong, Hangzhou (CN); Haixiao Jiang, Shenzhen (CN); Jinyi Zhang, Hangzhou (CN); Qiang Xue, Chengdu (CN); Jianqiang Shen, Hangzhou (CN); Gongyi Wang, Hangzhou (CN)

( * ) Notice: Subject to any disclaimer, the term of this patent is extended or adjusted under 35 U.S.C. 154(b) by 25 days.

(21) Appl. No.: 16/654,982

(22) Filed: Oct. 16, 2019

(65) Prior Publication Data
US 2020/0117386 A1 Apr. 16, 2020

Related U.S. Application Data

(63) Continuation of application No. PCT/CN2017/109360, filed on Nov. 3, 2017.

(51) Int. Cl.
*G06F 3/06* (2006.01)

(52) U.S. Cl.
CPC .......... *G06F 3/0653* (2013.01); *G06F 3/0608* (2013.01); *G06F 3/0629* (2013.01); *G06F 3/0659* (2013.01); *G06F 3/0683* (2013.01)

(58) Field of Classification Search
CPC .... G06F 3/0653; G06F 3/0608; G06F 3/0629; G06F 3/0659; G06F 3/0683; G06F 3/0689; G06F 3/067; G06F 3/0605; G06F 3/0632; G06F 3/0631; G06F 3/0607
See application file for complete search history.

(56) References Cited

U.S. PATENT DOCUMENTS

| | | | |
|---|---|---|---|
| 2003/0145167 A1 | 7/2003 | Tomita | |
| 2006/0143379 A1 | 6/2006 | Khan et al. | |
| 2008/0250199 A1 | 10/2008 | Lubbers | |
| 2010/0115210 A1 | 5/2010 | Wicklund | |
| 2010/0306468 A1 | 12/2010 | Shionoya | |
| 2015/0199152 A1 | 7/2015 | Asnaashari | |
| 2015/0269000 A1* | 9/2015 | Alexeev | G06F 3/0631 718/104 |

FOREIGN PATENT DOCUMENTS

| | | |
|---|---|---|
| CN | 101685380 A | 3/2010 |
| CN | 101840360 A | 9/2010 |
| CN | 102043685 A | 5/2011 |
| CN | 102819408 A | 12/2012 |
| CN | 105760254 A | 7/2016 |
| CN | 106648469 A | 5/2017 |

OTHER PUBLICATIONS

"Which Version of RAID is Best? RAID-0 vs. RAID-1 (https://web.archive.org/web/20161009130605/http://blog.logical increments.com/2016/10/vers ion-raid-best-raid-0-vs-raid-1/)," Logical Increments Blog, XP055836743, total 4 pages (Oct. 6, 2016).

* cited by examiner

*Primary Examiner* — Ramon A. Mercado
(74) *Attorney, Agent, or Firm* — Leydig, Voit & Mayer, Ltd.

(57) ABSTRACT

A method for obtaining a storage system capacity is provided. An available capacity that is of a storage system and that is associated with each stripe length is obtained based on an obtained stripe length that can be effectively configured. Therefore, an available capacity of a system is optimally selected.

18 Claims, 6 Drawing Sheets

| Candidate stripe length | Available capacity (GB) of a storage system | Capacity utilization (%) | Available capacity (GB) of a hot spare disk |
|---|---|---|---|
| 5 | 19980 | 49.33 | 7200 |
| 6 | 22200 | 54.81 | 7200 |
| 7 | 23785 | 58.73 | 7200 |
| 8 | 24975 | 61.67 | 7200 |
| 9 | 25900 | 63.95 | 7200 |
| 10 | 23400 | 57.78 | 11250 |
| 11 | 21060 | 52.00 | 14760 |
| 12 | 19500 | 48.15 | 17100 |
| 13 | 14850 | 36.67 | 22950 |
| 14 | 10800 | 26.67 | 27900 |
FIG. 9
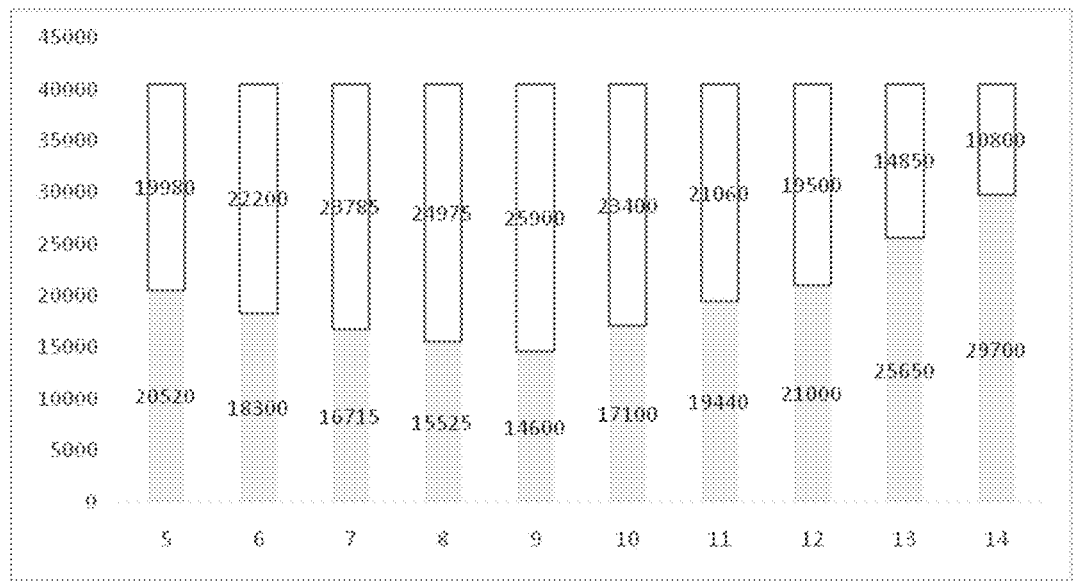
 Available capacity (GB)
 Unavailable capacity (GB)
FIG. 10

METHOD AND APPARATUS FOR CALCULATING STORAGE SYSTEM AVAILABLE CAPACITY

CROSS-REFERENCE TO RELATED APPLICATIONS

This application is a continuation of International Application No. PCT/CN2017/109360, filed on Nov. 3, 2017, the disclosure of which is hereby incorporated by reference in its entirety.

TECHNICAL FIELD

Embodiments of the present disclosure relate to the field of information technologies, and in particular, to a method and an apparatus for calculating a storage system available capacity.

BACKGROUND

A storage system includes a large quantity of disks. In actual application, capacities of the disks in the storage system are different from each other. In the prior art, to resolve a problem of different capacities of the disks in the storage system, the capacities of all disks are calculated based on a capacity of a disk whose capacity is the smallest in the storage system, so as to obtain an available capacity of the storage system. For example, a 0.6-terabyte (TB) disk, a 1.2-TB disk, and a 3.6-TB disk are in the storage system. The storage system calculates capacities of the 1.2-TB disk and the 3.6-TB disk based on 0.6 TB, and an obtained available capacity of the storage system is 1.8 TB. The storage system then performs configuration based on a striping algorithm. In this solution, no optimal available capacity of the storage system can be obtained, and capacities of the disks in the storage system are severely wasted.

SUMMARY

This disclosure provides a method and an apparatus for calculating a storage system capacity, to determine an optimal available capacity of a storage system and avoid a waste of a capacity of a disk in the storage system.

A first aspect of this disclosure provides a storage system available capacity calculation solution, where a storage system includes an available disk group $DG_i$, a quantity of disks in the available disk group $DG_i$ is $N_i$, a capacity of a disk $D_i$ in the $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$, where i is an integer from 1 to G, G is an integer, G is not less than 2, x is an integer, and x is an integer from 1 to G−1; and a stripe length that can be effectively configured in the storage system is [r, z], where r and z are positive integers and z is greater than r. In this solution, a management device obtains a candidate stripe length $LORIG_y$, where a value of y is an integer in the stripe length from r to z that can be effectively configured, $LORIG_y=y$, and $LORIG_y$ indicates that a stripe length y that can be effectively configured is used as a candidate stripe length. The management device calculates an available capacity that is of the storage system and that corresponds to a stripe having the candidate stripe length $LORIG_y$, so as to determine a maximum value from available capacities of the storage system, and avoid wasting a capacity of a disk in the storage system.

With reference to the first aspect of this disclosure, in a first implementation of the first aspect of this disclosure, this solution further includes: grouping, by the management device, available disks in the storage system, to obtain G available disk groups $DG_i$; and sorting the G available disk groups $DG_i$. The available disk is a disk other than a hot spare disk in the storage system.

With reference to the first aspect of this disclosure or the first implementation of the first aspect of this disclosure, in a second possible implementation, the management device determines, based on an available capacity that is of the storage system and that corresponds to each stripe having a candidate stripe length from $LORIG_r$ to $LORIG_z$, a candidate stripe length $LORIG_P$ corresponding to a maximum value of available capacities of the storage system, where a value of P is an integer in r to z. The maximum value of the available capacities of the storage system is determined while data of the storage system is protected and reliability of the storage system is improved.

With reference to the second possible implementation of the first aspect of this disclosure, in a third possible implementation, the management device configures a stripe length of the storage system as $LORIG_P$, so as to fully utilize a storage capacity of the storage system while the data of the storage system is protected and the reliability of the storage system is improved.

With reference to any one of the first aspect or the first to the third implementations of the first aspect of this disclosure, in a fourth possible implementation, the calculating, by the management device, an available capacity that is of the storage system and that corresponds to a stripe having the candidate stripe length $LORIG_y$, specifically includes: performing, by the management device, step a starting from t=1: determining whether $$CD_i * LCU_y \leq \sum_{i=t}^{G} CDG_i$$

is met, where $CDG_i = CD_i * N_i$; and when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and
when $$CD_i * LCU_y \leq \sum_{i=t}^{G} CDG_i$$

is met and t=1, performing step 2a;
when $$CD_i * LCU_y \leq \sum_{i=t}^{G} CDG_i$$

is met and t is greater than 1 and not greater than G, performing step 2b; or when $$CD_i * LCU_y \le \sum_{i=t}^{G} CDG_i$$

is not met and t is not greater than G, performing step 2c, where step 2a is calculating the available capacity that is of the storage system and that corresponds to the stripe having the candidate stripe length $LORIG_y$ as $$\left(\sum_{i=t}^{G} CDG_i\right) * V / LORIG_y,$$

where V is a quantity of data strips in the stripe;

step 2b is calculating the available capacity that is of the storage system and that corresponds to the stripe having the candidate stripe length $LORIG_y$ as $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y;$$

and step 2c is assigning t+1 to t, and performing step a, where t is not greater than G. An available capacity that can be used to effectively store data strips in the storage system for each stripe configuration is determined based on the quantity V of data strips in the stripe, so as to fully utilize the storage system to store user data, and improve utilization of the capacity of the disk in the storage system.

With reference to any one of the first aspect or the first to the third implementations of the first aspect of this disclosure, in a fifth possible implementation, the calculating, by the management device, an available capacity that is of the storage system and that corresponds to a stripe having the candidate stripe length $LORIG_y$ specifically includes: performing, by the management device, step a starting from t=1: determining whether $$CD_i * LCU_y \le \sum_{i=t}^{G} CDG_i$$

is met, where $CDG_i = CD_i * N_i$; and when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and when $$CD_i * LCU_y \le \sum_{i=t}^{G} CDG_i$$

is met and t=1, performing step 2a;

when $$CD_i * LCU_y \le \sum_{i=t}^{G} CDG_i$$

is met and t is greater than 1 and not greater than G, performing step 2b; or when $$CD_i * LCU_y \le \sum_{i=t}^{G} CDG_i$$

is not met and t is not greater than G, performing step 2c, where step 2a is calculating the available capacity that is of the storage system and that corresponds to the stripe having the candidate stripe length $LORIG_y$ as $$\sum_{i=1}^{G} CDG_i;$$

step 2b is calculating the available capacity that is of the storage system and that corresponds to the stripe having the candidate stripe length $LORIG_y$ as $$\left(\left(\sum_{i=t}^{G} CDG_i\right) / LCU_y\right) * \left(\sum_{i=1}^{t} N_i\right) + \sum_{i=t}^{G} CDG_i;$$

and step 2c is assigning t+1 to t, and performing step a, where t is not greater than G.

With reference to the fourth possible implementation or the fifth possible implementation of the first aspect of this disclosure, in a sixth possible implementation, the storage system further includes a hot spare disk, where a capacity of the hot spare disk is PC, and an available capacity of the hot spare disk is $$PC + \sum_{i=1}^{G} CDG_i - \left(\left(\left(\sum_{i=t}^{G} CDG_i\right) / LCU_y\right) * \left(\sum_{i=1}^{t} N_i\right) + \sum_{i=t}^{G} CDG_i\right).$$

When the maximum available capacity of the storage system is obtained, the available capacity of the hot spare disk in the storage system is obtained.

This disclosure is also applicable to a scenario in which the capacity $CD_x$ of the disk $D_x$ in the $DG_x$ is equal to the capacity $CD_{x+1}$ of the disk $D_{x+1}$ in the $DG_{x+1}$, that is, capacities of disks in the storage system are the same.

According to the implementations of the first aspect of this disclosure, in one implementation, a stripe whose stripe length that can be effectively configured in the storage system is [r, z] is a stripe using an erasure coding algorithm. In another implementation, a stripe whose stripe length that can be effectively configured in the storage system is [r, z] is a stripe using a multi-copy algorithm, and a quantity of data strips in the stripe is 1.

A second aspect of this disclosure further provides a storage system, where the storage system includes a controller and an available disk group $DG_i$, a quantity of disks in the available disk group $DG_i$ is $N_i$, a capacity of a disk $D_i$ in the $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$, where i is an integer from 1 to G, G is an integer, G is not less than 2, x is an integer, and x is an integer from 1 to G−1; and a stripe length that can be effectively configured in the storage system is [r, z], where r and z are positive integers and z is greater than r; and the controller includes a processor and an interface, the processor communicates with the interface, and the processor is configured to perform the solutions in the first aspect of this disclosure.

Correspondingly, a third aspect of this disclosure further provides an apparatus for calculating a storage system available capacity, and the apparatus is applied to the storage system in the first aspect of this disclosure. The apparatus for calculating a storage system available capacity includes a plurality of units configured to perform the solutions in the first aspect of this disclosure. In another implementation, the apparatus for calculating a storage system available capacity is applied to the storage system in the first aspect of this disclosure. The apparatus for calculating a storage system available capacity includes a processor and an interface, the processor communicates with the interface, and the processor is configured to perform the solutions in the first aspect of this disclosure.

Correspondingly, a fourth aspect of this disclosure further provides a computer readable storage medium and a computer program product. The computer readable storage medium and the computer program product include a computer instruction used to implement the solutions in the first aspect of this disclosure.

A fifth aspect of this disclosure provides a solution for calculating a storage system available capacity. This solution includes: obtaining, by a management device, information about an available disk, grouping available disks to obtain G available disk groups $DG_i$, and sorting the G available disk groups $DG_i$, where a quantity of disks in the available disk group $DG_i$ is $N_i$, a capacity of a disk $D_i$ in the $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$, where i is an integer from 1 to G, G is an integer, G is not less than 2, x is an integer, and x is an integer from 1 to G−1; and a stripe length that can be effectively configured in a storage system is [r, z], where r and z are positive integers and z is greater than r. Further, the management device obtains a candidate stripe length $LORIG_y$, where a value of y is an integer in the stripe length from r to z that can be effectively configured, $LORIG_y$=y, and $LORIG_y$ indicates that a stripe length y that can be effectively configured is used as a candidate stripe length. The management device calculates and displays an available capacity that is of the storage system and that corresponds to a stripe having the candidate stripe length $LORIG_y$, so as to determine a maximum value from available capacities of the storage system. Further, for implementations in the fifth aspect of this disclosure, refer to the implementations in the first aspect of this disclosure. Correspondingly, according to the fifth aspect of this disclosure and the implementations of the fifth aspect, a storage system, an apparatus for calculating a storage system available capacity, a computer readable storage medium, and a computer program product are further provided.

A sixth aspect of this disclosure provides a solution for calculating a storage system available capacity. This solution includes: obtaining, by a management device, information about an available disk, and grouping available disks to obtain G available disk groups $DG_i$, and sorting the G available disk groups $DG_i$, where a quantity of disks in the available disk group $DG_i$ is $N_i$, a capacity of a disk $D_i$ in the $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$, where i is an integer from 1 to G, G is an integer, G is not less than 2, x is an integer, and x is an integer from 1 to G−1; and a stripe length that can be effectively configured in a storage system is [r, z], where r and z are positive integers and z is greater than r. Further, the management device obtains a candidate stripe length $LORIG_y$, where a value of y is an integer in the stripe length from r to z that can be effectively configured, $LORIG_y$=y, and $LORIG_y$ indicates that a stripe length y that can be effectively configured is used as a candidate stripe length. The management device calculates an available capacity that is of the storage system and that corresponds to a stripe having the candidate stripe length $LORIG_y$, and the management device displays a maximum value of available capacities that are of the storage system and that correspond to stripes having candidate stripe lengths from $LORIG_r$ to $LORIG_z$, so as to determine the maximum value from the available capacities of the storage system. Further, the management device further displays a candidate stripe length $LORIG_P$ corresponding to the maximum value of the available capacities of the storage system, where a value of P is an integer in r to z. Further, for implementations in the sixth aspect of this disclosure, refer to the implementations in the first aspect of this disclosure. Correspondingly, according to the sixth aspect of this disclosure and the implementations of the sixth aspect, a storage system, an apparatus for calculating a storage system available capacity, a computer readable storage medium, and a computer program product are further provided.

BRIEF DESCRIPTION OF DRAWINGS

FIG. 9 is a schematic diagram of a result of an available capacity of a storage system according to an embodiment of the present invention;

FIG. 10 is a schematic diagram of a result of an available capacity of a storage system according to an embodiment of the present invention.

EMBODIMENTS OF THE PRESENT INVENTION

Figure 1:
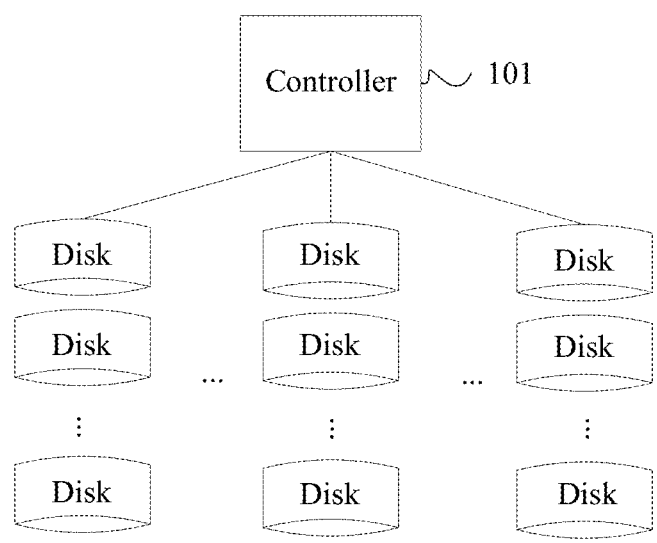
FIG. 1 is a schematic diagram of a storage system according to an embodiment of the present invention.

As shown in FIG. 1, a storage system in an embodiment of the present invention may be a storage array (for example, the Huawei® OceanStor® 18000 series or Dorado® V3 series), a distributed file storage system (for example, the Huawei® OceanStor® 9000 series), a distributed block storage system (for example, the Huawei® FusionStorage® series), or the like. In this embodiment of the present invention, a storage array is used as an example. The storage array includes a controller 101 and a plurality of disks, where the disk includes a solid state disk (SSD), a mechanical disk, a hybrid disk, or the like. The mechanical disk is, for example, an Hard Disk Drive (HDD).

Figure 2:
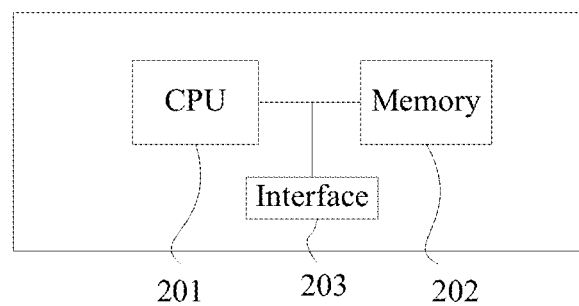
FIG. 2 is a schematic structural diagram of a controller according to an embodiment of the present invention.

As shown in FIG. 2, the controller 101 includes a central processing unit (CPU) 201, a memory 202, and an interface 203. The memory 202 stores a computer instruction. The CPU 201 executes the computer instruction in the memory 202 to perform management and data access operations on the storage system. In addition, to save computing resources of the CPU 201, a field programmable gate array (FPGA) or other hardware may also be configured to perform all operations of the CPU 201 in this embodiment of the present invention. Alternatively, the FPGA or other hardware and the CPU 201 each are configured to perform some operations of the CPU in this embodiment of the present invention. For ease of description, in this embodiment of the present invention, a combination of the CPU 201 and the memory 202 is collectively referred to as a processor; the FPGA or the other hardware is referred to as the processor; the FPGA or other hardware and the CPU 201 is also referred to as the processor. In the foregoing implementations, the processor communicates with the interface 203.

To improve reliability and prevent data loss, when storing data, the storage system usually stores data in a form of a stripe, that is, writes a plurality of strips in parallel into a plurality of memories (for example, a plurality of magnetic disks or a plurality of storage media).

A stripe usually means a set of a plurality of strips written in parallel into a plurality of memories when data is stored. A strip is also referred to as a stripe unit. A stripe includes strips. A stripe length usually means a quantity of strips included in a stripe. A type and a quantity of strips included in one stripe may be determined by a striping algorithm. The striping algorithm may be an erasure coding (EC) or multi-copy algorithm, or the like. For example, if the storage system uses the EC algorithm, strips included in a stripe need to be distributed on different disks. One stripe includes M data strips (a data strip is a strip that includes source data) and N parity strips (a parity strip is a strip that includes parity data), a stripe length is M+N, and M and N are both integers. In this case, (M+N) disks are required to store the strips in the stripe. Specifically, for example, the EC algorithm is a redundant array of independent disks (RAID) algorithm. For example, a quantity of parity strips of an EC stripe formed by using a RAID 5 algorithm is 1, and a stripe length of the EC stripe formed by using the RAID 5 algorithm is M+1; a quantity of parity strips of an EC stripe formed by using a RAID 6 algorithm is 2, and a stripe length of the EC stripe formed by using the RAID 6 algorithm is M+2. For another example, the storage system uses the multi-copy algorithm to obtain a stripe, and in a stripe formed by using a plurality of copies, a quantity of strips is equal to a quantity of copies. Using a three-copy algorithm as an example, one stripe includes three identical data strips, and the three identical data strips are respectively stored on three disks. In this case, a stripe length is 3. In a stripe using the multi-copy algorithm, one copy may be used as a data strip, and other copies are used as parity strips. Therefore, in the stripe using the multi-copy algorithm, a quantity of data strips is 1. Source data is also referred to as user-written data, and includes metadata. For a same striping algorithm, there may be different stripe lengths. For example, for the RAID 6 algorithm in the EC algorithm, there may be stripes having different lengths; for the multi-copy algorithm, there may also be different copy quantities.

A hot spare disk is a disk that stores data restored when data restoration is performed by using a striping algorithm to prevent data loss caused by a disk fault in a storage system.

An available capacity of a storage system is a capacity of a disk, other than a hot spare disk, that can be used to store data and that is in the storage system.

A principle of data-reliability-first is usually used in design of a storage system. In a storage system protected by using a striping algorithm, due to a reliability constraint, capacity of disks in the storage system may not be entirely used to store data, and there is a maximum value in available capacities of the storage system in different stripe length configurations. In this embodiment of the present invention, an available capacity that is of the storage system and that corresponds to each stripe length is calculated based on a disk capacity and a disk quantity of the storage system, and a striping algorithm; and then a stripe length corresponding to the maximum value of the available capacities of the storage system is used as an optimal stripe length.

In this embodiment of the present invention, the storage system includes, for example, 16 disks: three 900-gigabyte (GB) disks, five 1.8-TB disks, and eight 3.6-TB disks. A striping algorithm set for the storage system is RAID 6 (two parity strips are included), and two hot spare disks are needed. Therefore, a quantity of disks that can be used to store strips of a stripe is 14. A disk, other than the hot spare disk, that can be used to store a strip of the stripe is also referred to as an available disk. Usually, the storage system may provide, based on factors such as storage performance and reliability, a user with a stripe length that can be supported by the storage system, for example, [5, 25]. In other words, the stripe length supported by the storage system is 5 to 25. It can be learned from the foregoing description that the strips in the stripe need to be stored on different disks. Therefore, the stripe length is actually limited by a quantity of the disks. Therefore, the stripe length that can be actually configured by the storage system cannot exceed a quantity of available disks. A stripe length that can be actually configured by the storage system is referred to as a stripe length that can be effectively configured. Using this embodiment of the present invention as an example, in addition to the two hot spare disks, the quantity of available disks is 14. Therefore, the stripe length that can be effectively configured is [5, 14]. In other words, the stripe length that can be effectively configured is from 5 to 14.

In this embodiment of the present invention, to calculate a value of a storage capacity corresponding to each stripe length that can be effectively configured so as to determine a stripe length corresponding to a maximum value of available capacities of the storage system, in this embodiment of the present invention, each stripe length that can be effectively configured is referred to as a candidate stripe length in the following. An embodiment of the present invention provides an algorithm for calculating a storage system available capacity, and the algorithm can be used to determine, based on a quantity of available disks of the storage system, available capacities of the storage system that can be obtained when a same striping algorithm is used and different candidate stripe lengths are used, for example, available capacities obtained when different candidate stripe lengths and a RAID 6 algorithm are used. Because different available capacity values are obtained, a stripe length corresponding to a maximum available capacity of the storage system can be determined, and the storage system is configured based on the determined stripe length, so as to improve utilization of a capacity of a disk in the storage system.

Figure 3:
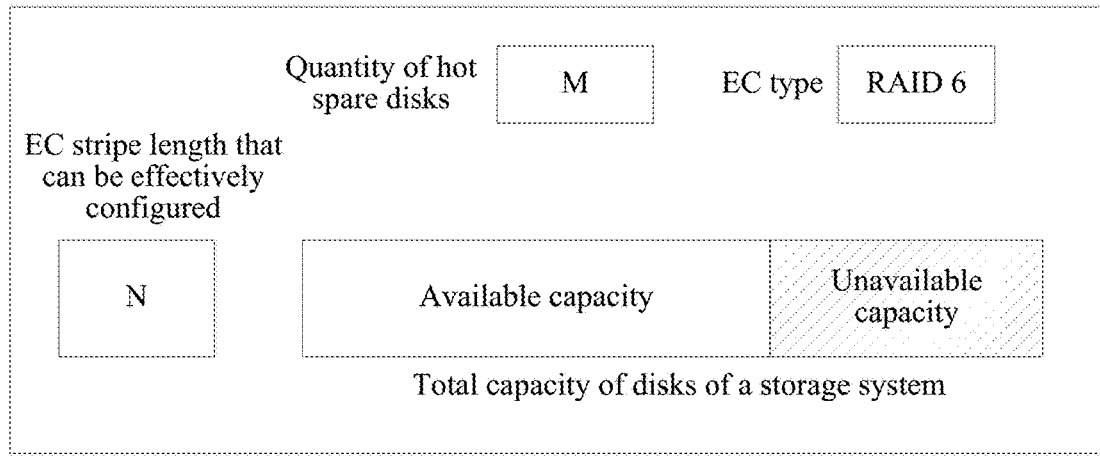
FIG. 3 is a schematic diagram of a storage capacity of a storage system according to an embodiment of the present invention.

An application scenario in this embodiment of the present invention is shown in FIG. 3. A storage vendor recommends a proper storage system configuration for a user, to display information such as an available capacity and an unavailable capacity that are of the storage system and that correspond to each candidate stripe length. Based on disk information of the storage system, an interface shown in FIG. 3 is provided. A user can input a hot spare disk quantity M, a striping algorithm type (for example, EC), and the like. The storage system calculates and displays, based on a candidate EC stripe length, the disk information of the storage system, and the like, an available capacity and an unavailable capacity that correspond to each candidate stripe length; may further display a maximum value of available capacities that are of the storage system and that correspond to stripes having all candidate stripe lengths; and may further display a candidate stripe length corresponding to the maximum value of the available capacities of the storage system. During specific implementation, a website or an application provided by the storage vendor may provide the foregoing operations for the user. In this application scenario, the specific implementation may be as follows: A server running the website or the application is used as a management device to calculate information such as the available capacity and the unavailable capacity that are of the storage system and that correspond to each candidate stripe length. For a structure of the management device, refer to a structure and a corresponding implementation shown in FIG. 2. Further, the management device further includes a display device.

Figure 4:
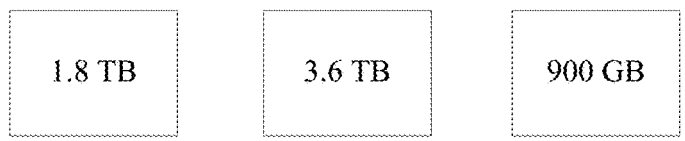
FIG. 4 is a schematic diagram of a storage capacity of a storage system according to an embodiment of the present invention.
Figure 4:
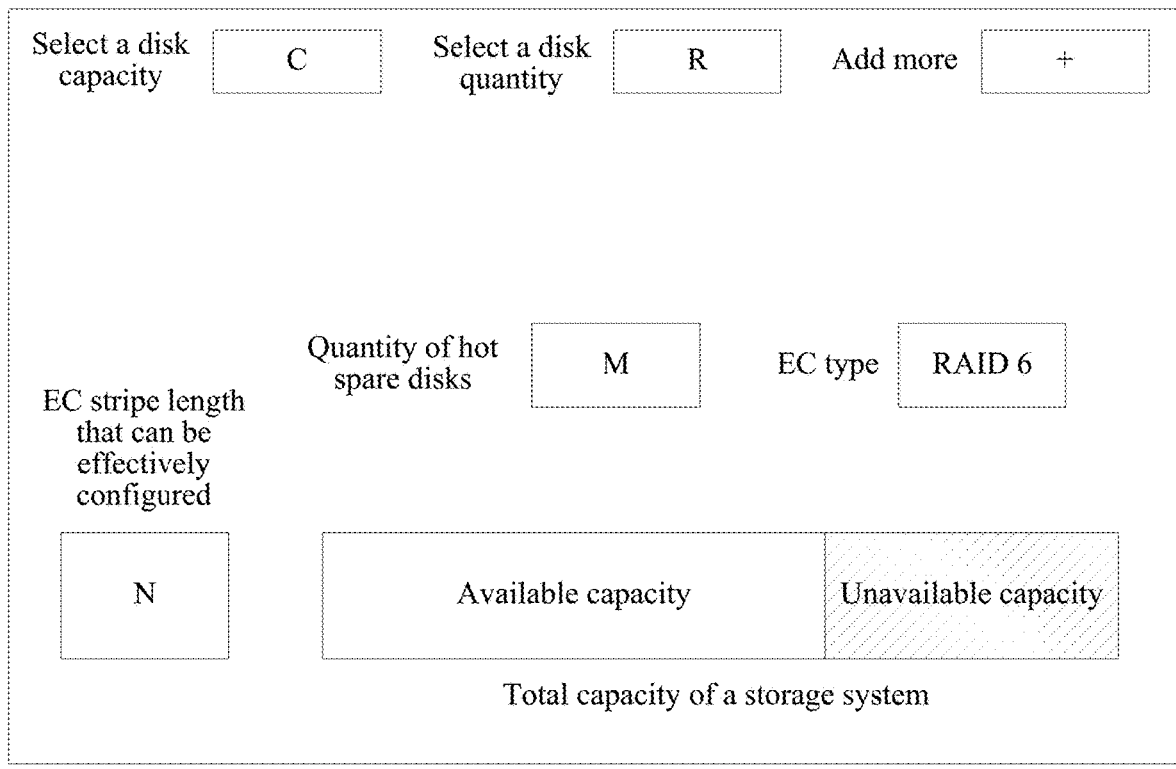

To further help a user perform selection, an embodiment of the present invention may further provide an interface shown in FIG. 4, so as to provide higher flexibility in selecting and configuring the storage system by the user. In the interface in FIG. 4, selectable disk capacities such as 1.8 TB, 3.6 TB, and 900 GB are presented. The interface further provides an option of "select a disk capacity C" and an option of "select a disk quantity" for the user to enter a disk capacity and quantity. During specific implementation, the selectable disk capacities displayed in FIG. 4 may be omitted, and the disk capacities are directly presented in the option of "select a disk capacity C". To enable the user to select disks of different capacities, the interface shown in FIG. 4 further includes a "further add" option for the user to further select disks of different capacities and a quantity of the disks. The user selects a storage system by using the interface shown in FIG. 4. Description of other options in the interface in FIG. 4 is shown in FIG. 3, and details are not described herein again.

Figure 5:
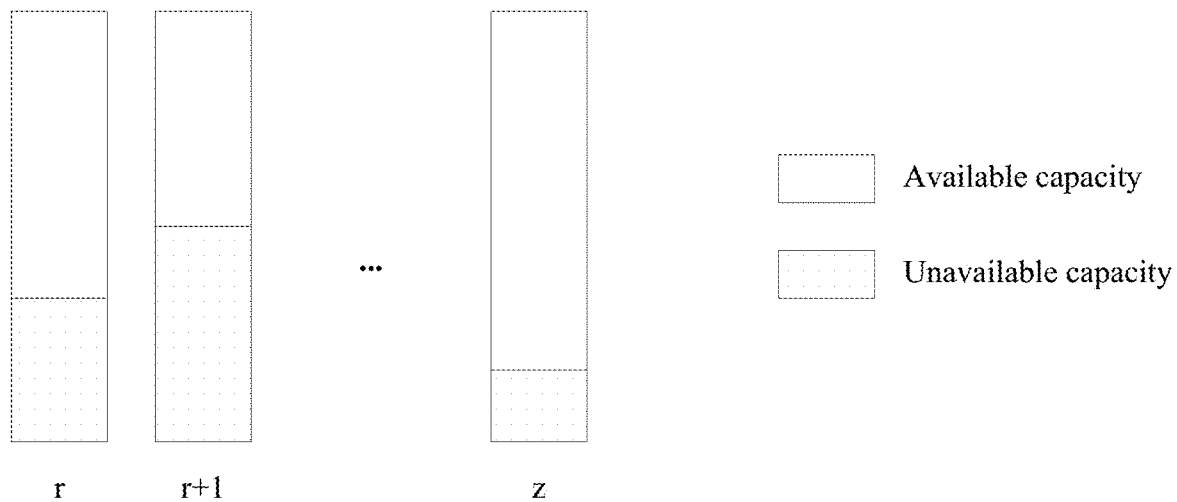
FIG. 5 is a schematic diagram of a storage capacity of a storage system according to an embodiment of the present invention.

To help a user obtain the information such as the available capacity and the unavailable capacity that are of the storage system and that correspond to the candidate stripe length, as shown in FIG. 5, a user interface further provides an interface of the available capacity and the unavailable capacity that are of the storage system and that correspond to a stripe having a candidate stripe length from $LORIG_r$ to $LORIG_z$. The interfaces shown in FIG. 3 to FIG. 5 provide storage system configuration options for the user, and the user selects a corresponding configured storage system. The interfaces shown in FIG. 3 to FIG. 5 may be integrated into the storage system. To be specific, the storage system provides operations shown in FIG. 3 to FIG. 5. Specifically, in an implementation, a controller of the storage system may be used as a management device to calculate information such as an available capacity and an unavailable capacity that are of the storage system and that correspond to a stripe having each candidate stripe length, and determine a stripe length corresponding to the maximum value of the available capacities in the storage system. The storage system configures the stripe to have the length. In another implementation, the management device of the storage system may calculate information such as an available capacity and an unavailable capacity that are of the storage system and that correspond to a stripe having each candidate stripe length, and determine a stripe length corresponding to the maximum value of the available capacities in the storage system. The storage system configures the stripe to have the length.

During specific implementation, the management device obtains disk information in the storage system. The disk information includes a disk capacity and quantity. The obtaining, by the management device, disk information in the storage system specifically includes: collecting information about a disk installed on the storage system or storage system disk information entered by a user. The management device selects, based on the obtained disk information and a quantity of hot spare disks, a disk whose capacity is the largest from the storage system as a hot spare disk. When a quantity of disks whose capacities are the largest in the storage system is less than the quantity of hot spare disks, a hot spare disk is further selected from disks whose capacities are the second largest. The management device groups disks except the hot spare disks in the storage system, that is, groups available disks, to obtain an available disk group $DG_i$. A capacity of the hot spare disk is PC. The quantity of hot spare disks is determined by a striping algorithm, for example, RAID 6, which requires two hot spare disks. Disks whose capacities are the same are in a same available disk group $DG_i$, and a quantity of disks in the available disk group $DG_i$ is $N_i$. A capacity of a disk $D_i$ in the available disk group $DG_i$ is $CD_i$. The management device sorts available disk groups as $DG_1$ to $DG_G$ in descending order of capacities of disks in the available disk groups. To be specific, a capacity $CD_x$ of a disk $D_x$ in a $DG_x$ is greater than a capacity $CD_{x+1}$ of a disk $D_{x+1}$ in a $DG_{x+1}$, and a sequence of the available disk groups is 1 to G. i is an integer from 1 to G, G is an integer, G is not less than 2, x is an integer, and x is an integer from 1 to G−1. A stripe length that can be effectively configured in the storage system is [r, z], where r and z are positive integers and z is greater than r. The management device performs a procedure shown in FIG. 6 based on a same striping algorithm and each stripe length in the stripe lengths [r, z] that can be effectively configured:

601. Obtain a candidate stripe length $LORIG_y$. A value of y is an integer in the stripe length from r to z that can be effectively configured. For ease of description, $LORIG_y$ is used to represent the candidate stripe length. To be specific, the candidate stripe length $LORIG_y$ is equal to the stripe length y that can be effectively configured. $LORIG_y$ indicates that the stripe length y that can be effectively configured is used as the candidate stripe length, and obtaining the candidate stripe length $LORIG_y$ means obtaining the stripe length y that can be effectively configured.

602. Calculate an available capacity that is of the storage system and that corresponds to a stripe having the candidate stripe length $LORIG_y$.

The management device determines, based on an available capacity that is of the storage system and that corresponds to each stripe having a candidate stripe length from $LORIG_r$ to $LORIG_z$, a stripe length $LORIG_P$ corresponding to a maximum value of available capacities of the storage system, where a value of P is an integer in r to z. Further, the management device configures a stripe length of the storage system as $LORIG_P$. In other words, the stripe length of the storage system is configured as P. In this embodiment of the present invention, stripes whose stripe lengths are [r, z] use a same striping algorithm, for example, RAID 6. In this embodiment of the present invention, the available capacity that is of the storage system and that corresponds to the stripe having the candidate stripe length from $LORIG_r$ to $LORIG_z$ is calculated to determine the stripe length corresponding to the maximum value of the available capacities of the storage system, so as to improve utilization of a capacity of a disk in the storage system.

Figure 7:
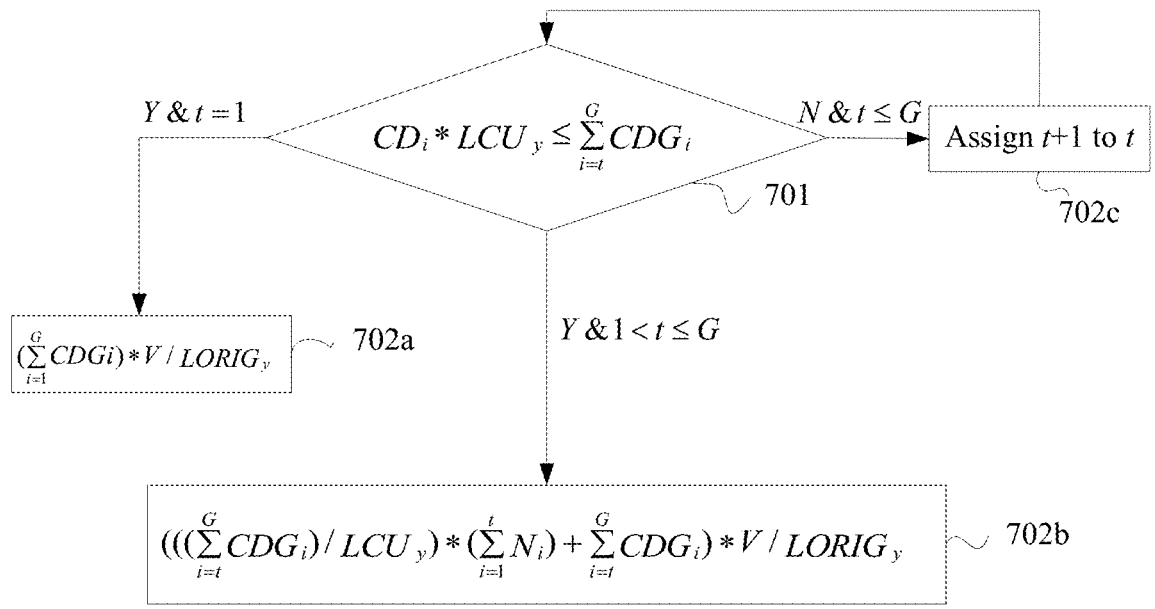
FIG. 7 is a flowchart of calculating an available capacity of a storage system according to an embodiment of the present invention.

In an implementation, step 602, as shown in FIG. 7, specifically includes the following steps.

Step 701: Determine whether $$CD_i * LCU_y \le \sum_{i=t}^{G} CDG_i$$

is met, where $CDG_i = CD_i * N_i$; when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and t means when $CD_i * LCU_y$ does not meet the foregoing condition, a next available disk group is selected from the available disk group sequence in ascending order as a minimum value of the currently available disk group sequence.

When $$CD_i * LCU_y \le \sum_{i=t}^{G} CDG_i$$

is met and t=1 (denoted as Y&t=1), perform step 702a.
When $$CD_i * LCU_y \le \sum_{i=t}^{G} CDG_i$$

is met and t is greater than 1 and not greater than G (denoted as Y&1<t≤G), perform step 702b.
When $$CD_i * LCU_y \le \sum_{i=t}^{G} CDG_i$$

is not met and t is not greater than G (denoted as N&t≤G), perform step 702c.

Step 702a: Calculate the available capacity that is of the storage system and that corresponds to the stripe having the candidate stripe length $LORIG_y$ as $$\left(\sum_{i=1}^{G} CDG_i\right) * V / LORIG_y,$$

where V is a quantity of data strips in the stripe. In a stripe that has a length of M+N and that is generated by using an EC algorithm, V=M; and in a stripe generated by using a multi-copy algorithm, V=1. A capacity that can be used to effectively store data strips in the storage system for each stripe configuration is determined based on the quantity V of data strips in the stripe, so as to fully utilize the storage system to store user data, and improve utilization of the capacity of the disk in the storage system.

Step 702b: Calculate the available capacity that is of the storage system and that corresponds to the stripe having the candidate stripe length $LORIG_y$ as $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y.$$

Step 702c: Assign t+1 to t, and perform step 701, where t is not greater than G.

In step 702a, an available capacity of a hot spare disk in the storage system is PC. In step 702b, an available capacity of a hot spare disk in the storage system is $$PC + \sum_{i=1}^{G} CDG_i - \left(\left(\left(\sum_{i=t}^{G} CDG_i\right) / LCU_y\right) * \left(\sum_{i=1}^{t} N_i\right) + \sum_{i=t}^{G} CDG_i\right).$$

The available capacity of the hot spare disk in the storage system is a disk capacity that can be used by the hot spare disk in the storage system to store data restored from a stripe.

Figure 8:
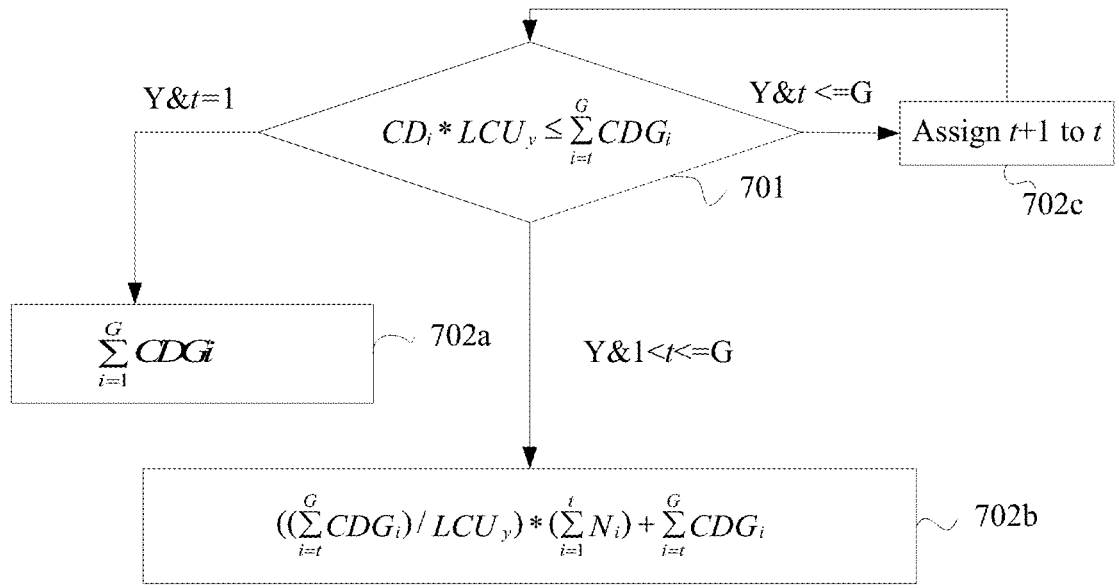
FIG. 8 is a flowchart of calculating an available capacity of a storage system according to an embodiment of the present invention.

In another implementation, step 602, as shown in FIG. 8, specifically includes the following steps.

Step 801: Determine whether $$CD_i * LCU_y \le \sum_{i=t}^{G} CDG_i$$

is met, where $CDG_i = CD_i * N_i$; when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and t means when $CD_i*LCU_y$ does not meet the foregoing condition, a next available disk group is selected from the available disk group sequence in ascending order as a minimum value of the currently available disk group sequence.

When $$CD_i * LCU_y \leq \sum_{i=t}^{G} CDG_i$$

is met and t=1 (denoted as Y&t=1), perform step 802a.

When $$CD_i * LCU_y \leq \sum_{i=t}^{G} CDG_i$$

is met and t is greater than 1 and not greater than G (denoted as Y&1<t≤G), perform step 802b.

When $$CD_i * LCU_y \leq \sum_{i=t}^{G} CDG_i$$

is not met and t is not greater than G (denoted as N&t≤G), perform step 802c.

Step 802a: Calculate the available capacity that is of the storage system and that corresponds to the stripe having the candidate stripe length $LORIG_y$ as $$\sum_{i=1}^{G} CDG_i.$$

Step 802b: Calculate the available capacity that is of the storage system and that corresponds to the stripe having the candidate stripe length $LORIG_y$ as $$\left(\left(\sum_{i=t}^{G} CDG_i\right) \Big/ LCU_y\right) * \left(\sum_{i=1}^{t} N_i\right) + \sum_{i=t}^{G} CDG_i.$$

Step 802c: Assign t+1 to t, and perform step 801, where t is not greater than G.

In step 802a, an available capacity of a hot spare disk in the storage system is PC. In step 802b, an available capacity of a hot spare disk in the storage system is $$PC + \sum_{i=1}^{G} CDG_i - \left(\left(\sum_{i=t}^{G} CDG_i\right) \Big/ LCU_y\right) * \left(\sum_{i=1}^{t} N_i\right) + \sum_{i=t}^{G} CDG_i\right).$$

The available capacity of the hot spare disk in the storage system is a disk capacity that can be used by the hot spare disk in the storage system to store data restored from a stripe.

In the embodiment shown in FIG. 8, the available capacity that is of the storage system and that corresponds to the stripe having each candidate stripe length may be calculated.

Figure 6:
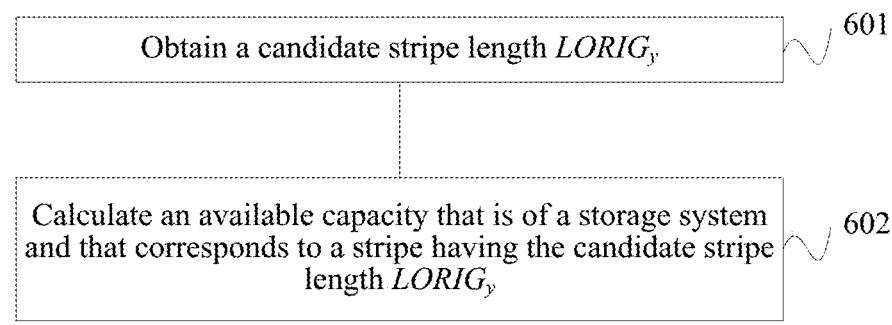
FIG. 6 is a flowchart of a method according to an embodiment of the present invention.

In this embodiment of the present invention, the storage system includes, for example, 16 disks: three 900 GB disks, five 1.8 TB disks, and eight 3.6-TB disks. The storage system is set as RAID 6 (two parity strips are included), and needs two hot spare disks. Two hot spare disks whose single-disk capacities are the largest are selected. Capacities of the hot spare disks are 7.2 TB (7200 GB). A capacity $CD_1$ of a disk D1 in an available disk group $DG_1$ is 3.6 TB, and a quantity $N_1$ of disks in the available disk group $DG_i$ is 6; a capacity $CD_2$ of a disk D2 in an available disk group $DG_2$ is 1.8 TB, and a quantity $N_2$ of disks in the available disk group $DG_2$ is 5; and a capacity $CD_3$ of a disk D3 in an available disk group $DG_3$ is 900 GB, and a quantity $N_3$ of disks in the available disk group $DG_3$ is 3. The available disk groups are sorted as $DG_1$ to $DG_3$ in descending order of capacities of disks in the available disk groups. i is an integer from 1 to 3. To be specific, a value of i is 1, 2, or 3. G=3. A stripe length that can be effectively configured is [5,14], that is, r=5, and z=14. With reference to FIG. 6 and FIG. 7, available capacities that are of the storage system and that correspond to stripes whose candidate stripe lengths are 5 to 14 are calculated respectively.

Based on the procedure shown in FIG. 7: (1) Calculate the available capacity that is of the storage system and that corresponds to the stripe whose candidate stripe length is 5, where t represents a minimum value of a currently available disk group sequence, an initial value of t is 1, and $CD_1*LCU_5$=3.6 TB*5<(900 GB*3+1.8 TB*5+3.6 TB*6); and perform step 702a, where when the candidate stripe length is 5, V=3, an available capacity $$\left(\sum_{i=1}^{G} CDG_i\right) * V / LORIG_y = 33300 \; GB * 3/5 = 19980 \; GB,$$

and an available capacity of a hot spare disk is 7200 GB.

(2) Calculate the available capacity that is of the storage system and that corresponds to the stripe whose candidate stripe length is 6, where t represents a minimum value of a currently available disk group sequence, an initial value of t is 1, and $CD_1*LCU_6$=3.6 TB*6<(900 GB*3+1.8 TB*5+3.6 TB*6); and perform step 702a, where when the candidate stripe length is 6, V=4, an available capacity $$\left(\sum_{i=1}^{G} CDG_i\right) * V / LORIG_y = 33300 \; GB * 4/6 = 22200 \; GB,$$

and an available capacity of a hot spare disk is 7200 GB.

(3) Calculate the available capacity that is of the storage system and that corresponds to the stripe whose candidate stripe length is 7, where t represents a minimum value of a currently available disk group sequence, an initial value of t is 1, and $CD_1*LCU_7$=3.6 TB*7<(900 GB*3+1.8 TB*5+3.6 TB*6); and perform step 702a, where when the candidate stripe length is 7, V=5, an available capacity $$\left(\sum_{i=1}^{G} CDG_i\right) * V / LORIG_y = 33300 \ GB * 5/7 = 23785 \ GB,$$

and an available capacity of a hot spare disk is 7200 GB.

(4) Calculate the available capacity that is of the storage system and that corresponds to the stripe whose candidate stripe length is 8, where t represents a minimum value of a currently available disk group sequence, an initial value of t is 1, and $CD_1*LCU_8$=3.6 TB*8<(900 GB*3+1.8 TB*5+3.6 TB*6); and perform step 702a, where when the candidate stripe length is 8, V=6, an available capacity $$\left(\sum_{i=1}^{G} CDG_i\right) * V / LORIG_y = 33300 \ GB * 6/8 = 24975 \ GB,$$

and an available capacity of a hot spare disk is 7200 GB.

(5) Calculate the available capacity that is of the storage system and that corresponds to the stripe whose candidate stripe length is 9, where t represents a minimum value of a currently available disk group sequence, an initial value of t is 1, and $CD_1*LCU_9$=3.6 TB*9<(900 GB*3+1.8 TB*5+3.6 TB*6); and perform step 702a, where when the candidate stripe length is 9, V=7, an available capacity $$\left(\sum_{i=1}^{G} CDG_i\right) * V / LORIG_y = 33300 \ GB * 7/9 = 25900 \ GB,$$

and an available capacity of a hot spare disk is 7200 GB.

(6) Calculate the available capacity that is of the storage system and that corresponds to the stripe whose candidate stripe length is 10, where t represents a minimum value of a currently available disk group sequence, an initial value of t is 1, and $CD_1*LCU_{10}$=3.6 TB*10>(900 GB*3+1.8 TB*5+3.6 TB*6); perform step 702c: assign t+1 to t, which means that a new t is equal to 2 and a minimum value of the currently available disk group sequence is 2; perform step 701, where $$LCU_{10} = LORIG_y - \sum_{i=1}^{t-1} N_i = 10 - 6 = 4;$$

and because $CD_2*LCU_4$=1.8 TB*4<(900 GB*3+1.8 TB*5), perform step 702b. When the candidate stripe length is 10, V=8, $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y =$$

$$(((900 \ GB*3 + 1.8 \ TB*5)/4)*6 + 900 \ GB*3 + 1.8 \ TB*5)*8/10 =$$

23400 GB, and an available capacity of a hot spare disk is $$PC + \sum_{i=1}^{G} CDG_i - \left(\left(\left(\sum_{i=t}^{G} CDG_i\right) / LCU_y\right) * \left(\sum_{i=1}^{t} N_i\right) + \sum_{i=t}^{G} CDG_i\right) =$$

7.2 TB + 900 GB*3 + 1.8 TB*5 +

3.6 TB*6 − ((900 GB*3 + 1.8 TB*5)/4)*6 +

900 GB*3 + 1.8 TB*5 = 11250 GB.

(7) Calculate the available capacity that is of the storage system and that corresponds to the stripe whose candidate stripe length is 11, where t represents a minimum value of a currently available disk group sequence, an initial value of t is 1, and $CD_1*LCU_{11}$=3.6 TB*11>(900 GB*3+1.8 TB*5+3.6 TB*6); perform step 702c: assign t+1 to t, which means that a new t is equal to 2 and a minimum value of the currently available disk group sequence is 2; perform step 701, where $$LCU_{11} = LORIG_y - \sum_{i=1}^{t-1} N_i = 11 - 6 = 5;$$

and because $CD_2*LCU_5$=1.8 TB*5<(900 GB*3+1.8 TB*5), perform step 702b. When the candidate stripe length is 11, V=9, $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y =$$

$$(((900 \ GB*3 + 1.8 \ TB*5)/5)*6 + 900 \ GB*3 + 1.8 \ TB*5)*9/11 =$$

21060 GB, and an available capacity of a hot spare disk is $$PC + \sum_{i=1}^{G} CDG_i - \left(\left(\left(\sum_{i=t}^{G} CDG_i\right) / LCU_y\right) * \left(\sum_{i=1}^{t} N_i\right) + \sum_{i=t}^{G} CDG_i\right) =$$

7.2 TB + 900 GB*3 + 1.8 TB*5 +

3.6 TB*6 − ((900 GB*3 + 1.8 TB*5)/5)*6 +

900 GB*3 + 1.8 TB*5 = 14760 GB.

(8) Calculate the available capacity that is of the storage system and that corresponds to the stripe whose candidate stripe length is 12, where t represents a minimum value of a currently available disk group sequence, an initial value of t is 1, and $CD_1*LCU_{12}$=3.6 TB*12>(900 GB*3+1.8 TB*5+3.6 TB*6); perform step 702c: assign t+1 to t, which means that a new t is equal to 2 and a minimum value of the currently available disk group sequence is 2; perform step 701, where $$LCU_{12} = LORIG_y - \sum_{i=1}^{t-1} N_i = 12 - 6 = 6;$$

and because $CD_2*LCU_6$=1.8 TB*6<(900 GB*3+1.8 TB*5), perform step 702b. When the candidate stripe length is 12, V=10, $$\left(\left(\left(\sum_{i=t}^{G} CDG_i\right) \bigg/ LCU_y\right) * \left(\sum_{i=1}^{t} N_i\right) + \sum_{i=t}^{G} CDG_i\right) * V/LORIG_y =$$

$$(((900\ GB*3+1.8\ TB*5)/6)*6+900\ GB*3+1.8\ TB*5)*10/12 =$$

$$19500\ GB,$$

and an available capacity of a hot spare disk is $$PC + \sum_{i=1}^{G} CDG_i - \left(\left(\left(\sum_{i=t}^{G} CDG_i\right) \bigg/ LCU_y\right) * \left(\sum_{i=1}^{t} N_i\right) + \sum_{i=t}^{G} CDG_i\right) =$$

$$7.2\ TB + 900\ GB*3 + 1.8\ TB*5 +$$

$$3.6\ TB*6 - ((900\ GB*3 + 1.8\ TB*5)/6)*6 +$$

$$900\ GB*3 + 1.8\ TB*5 = 17100\ GB.$$

(9) Calculate the available capacity that is of the storage system and that corresponds to the stripe whose candidate stripe length is 13, where t represents a minimum value of a currently available disk group sequence, an initial value of t is 1, and $CD_1*LCU_{13}$=3.6 TB*13>(900 GB*3+1.8 TB*5+ 3.6 TB*6); perform step 702c: assign t+1 to t, which means that a new t is 2 and a minimum value of the currently available disk group sequence is 2; perform step 701, where $$LCU_{13} = LORIG_y - \sum_{i=1}^{t-1} N_i = 13 - 6 = 7;$$

and because $CD_2*LCU_7$=1.8 TB*7>(900 GB*3+1.8 TB*5), perform step 702c: assign t+1 to t, which means that a new t is 3 and a minimum value of the currently available disk group sequence is 3; perform step 701, where $$LCU_{13} = LORIG_y - \sum_{i=1}^{t-1} N_i = 13 - 6 - 5 = 2;$$

and because $CD_3*LCU_2$=900 GB*2<900 GB*3, perform step 702b. When the candidate stripe length is 13, V=11, $$\left(\left(\left(\sum_{i=t}^{G} CDG_i\right) \bigg/ LCU_y\right) * \left(\sum_{i=1}^{t} N_i\right) + \sum_{i=t}^{G} CDG_i\right) * V/LORIG_y =$$

$$(((900\ GB*3)/2)*11 + 900\ GB*3)*11/13 = 14850\ GB,$$

and an available capacity of a hot spare disk is $$PC + \sum_{i=1}^{G} CDG_i - \left(\left(\left(\sum_{i=t}^{G} CDG_i\right) \bigg/ LCU_y\right) * \left(\sum_{i=1}^{t} N_i\right) + \sum_{i=t}^{G} CDG_i\right) =$$

$$7.2\ TB + 900\ GB*3 + 1.8\ TB*5 + 3.6\ TB*6 -$$

$$((900\ GB*3)/2)*11 + 900\ GB*3 = 22950\ GB.$$

(10) Calculate the available capacity that is of the storage system and that corresponds to the stripe whose candidate stripe length is 14, where t represents a minimum value of a currently available disk group sequence, an initial value of t is 1, and $CD_1*LCU_{14}$=3.6 TB*14>(900 GB*3+1.8 TB*5+ 3.6 TB*6); perform step 702c: assign t+1 to t, which means that a new t is 2 and a minimum value of the currently available disk group sequence is 2; perform step 701, where $$LCU_{14} = LORIG_y - \sum_{i=1}^{t-1} N_i = 14 - 6 = 8;$$

because $CD_2*LCU_8$=1.8 TB*8>(900 GB*3+1.8 TB*5), perform step 702c: assign t+1 to t, which means that a new t is 3 and a minimum value of the currently available disk group sequence is 3; and perform step 701, where $$LCU_{14} = LORIG_y - \sum_{i=1}^{t-1} N_i = 14 - 6 - 5 = 3;$$

and because $CD_3*LCU_3$=900 GB*3=900 GB*3, perform step 702b. When the candidate stripe length is 14, V=12, $$\left(\left(\left(\sum_{i=t}^{G} CDG_i\right) \bigg/ LCU_y\right) * \left(\sum_{i=1}^{t} N_i\right) + \sum_{i=t}^{G} CDG_i\right) * V/LORIG_y =$$

$$(((900\ GB*3)/3)*11 + 900\ GB*3)*12/14 = 10800\ GB,$$

and an available capacity of a hot spare disk is $$PC + \sum_{i=1}^{G} CDG_i - \left(\left(\left(\sum_{i=t}^{G} CDG_i\right) \bigg/ LCU_y\right) * \left(\sum_{i=1}^{t} N_i\right) + \sum_{i=t}^{G} CDG_i\right) =$$

$$7.2\ TB + 900\ GB*3 + 1.8\ TB*5 + 3.6\ TB*6 -$$

$$((900\ GB*3)/3)*11 + 900\ GB*3 = 27900\ GB.$$

Based on the procedures shown in FIG. 6 and FIG. 7, the following are obtained: an available capacity and capacity utilization that are of the storage system and that correspond to a stripe whose candidate stripe length is from 5 to 14, and an available capacity of a hot spare disk that are shown in FIG. 9. The capacity utilization is a percentage of the available capacity of the storage system in a total capacity of the storage system. Therefore, in this embodiment of the present invention, the storage system is configured as a stripe whose stripe length is 9, and the storage system has a largest available capacity: 25900 GB. The capacity utilization reaches 63.95%. In this embodiment of the present invention, the available capacity that is of the storage system and that corresponds to the stripe whose candidate stripe length is from 5 to 14 is calculated based on the procedures shown in FIG. 6 and FIG. 7, to generate a graph shown in FIG. 10.

In this embodiment of the present invention, when the available capacity that is of the storage system and that corresponds to the stripe whose candidate stripe length is from 5 to 14 is calculated, the calculation may be performed starting from a stripe whose candidate stripe length is 5, or may be performed starting from a stripe whose candidate stripe length is 14. Available capacities that are of the storage system and that correspond to stripes having a plurality of candidate stripe lengths may alternatively be calculated in parallel. This is not limited in this embodiment of the present invention.

The solution for calculating a storage system available capacity in this embodiment of the present invention may be used to provide disk capacity planning for a user when the user purchases a storage system. The solution for calculating a storage system available capacity in this embodiment of the present invention may also be used to configure a stripe of the storage system. In this embodiment of the present invention, the storage system is configured as follows: Two 3.6 TB hot spare disks are used, a RAID 6 (two parity strips) algorithm is used, and a stripe length is 9, so as to improve utilization of a capacity of a disk in the storage system.

In addition, this embodiment of the present invention is also applicable to a scenario in which the capacity $CD_x$ of the disk $D_x$ in the $DG_x$ is equal to the capacity $CD_{x+1}$ of the disk $D_{x+1}$ in the $DG_{x+1}$, that is, capacities of disks in the storage system are the same.

Figure 11:
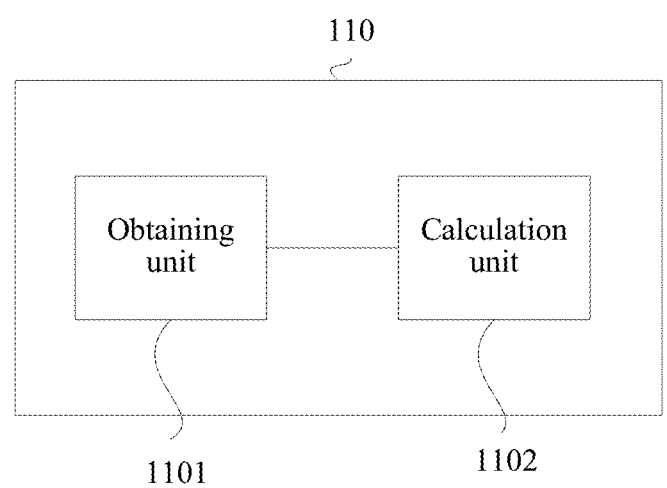
FIG. 11 is a schematic structural diagram of an apparatus for calculating a storage system capacity according to an embodiment of the present invention.

Based on the foregoing embodiments, as shown in FIG. 11, an embodiment of the present invention further provides an apparatus for calculating a storage system available capacity, and the apparatus is applied to the management device in the embodiments of the present invention. Specifically, the apparatus 110 for calculating a storage system available capacity includes an obtaining unit 1101 and a calculation unit 1102. The obtaining unit 1101 is configured to obtain a candidate stripe length $LORIG_y$, where a value of y is an integer in a stripe length from r to z that can be effectively configured, and $LORIG_y=y$. The calculation unit 1102 is configured to calculate an available capacity that is of a storage system and that corresponds to a stripe having the candidate stripe length $LORIG_y$. Further, the apparatus 110 for calculating a storage system available capacity further includes a grouping unit and a sorting unit. The grouping unit is configured to group available disks in the storage system, to obtain G available disk groups $DG_i$. The sorting unit is configured to sort the G available disk groups $DG_i$. Further, the apparatus 110 for calculating a storage system available capacity further includes a determining unit, configured to: determine, based on an available capacity that is of the storage system and that corresponds to a stripe having a candidate stripe length from $LORIG_r$ to $LORIG_z$, a candidate stripe length $LORIG_P$ corresponding to a maximum value of available capacities of the storage system, where a value of P is an integer in r to z. Further, the apparatus 110 for calculating a storage system available capacity further includes a configuration unit, configured to configure a stripe length of the storage system as $LORIG_P$. Optionally, the calculation unit 1102 is specifically configured to perform the procedure shown in FIG. 7 or FIG. 8. Further, the apparatus for calculating a storage system available capacity further includes a display unit, configured to display various calculation results in this embodiment of the present invention. An embodiment of the present invention further provides a specific implementation of the apparatus for calculating a storage system available capacity. Refer to the foregoing description in the embodiments of the present invention. Details are not described herein again.

Likewise, the apparatus 100 for calculating a storage system available capacity is also applicable to a scenario in which the capacity $CD_x$ of the disk $D_x$ in the $DG_x$ is equal to the capacity $CD_{x+1}$ of the disk $D_{x+1}$ in the $DG_{x+1}$, that is, capacities of disks in the storage system are the same.

The apparatus 100 for calculating a storage system available capacity shown in FIG. 11 may be specifically a management device. For description of the management device, refer to the foregoing description. The obtaining unit 1101 and the calculation unit 1102 correspond to a processor of the management device. In another implementation, the apparatus 100 for calculating a storage system available capacity may be a computer program, where the computer program includes a computer instruction used to implement functions of the obtaining unit 1101 and the calculation unit 1102. The computer program may be stored in a computer readable storage medium, or the computer program may be on a server for a user to use or download. The computer readable storage medium may be nonvolatile or volatile. That the computer program is stored on the server for the user to use may be specifically: a processor of the server executes the computer instruction in the computer program.

Correspondingly, an embodiment of the present invention further provides a computer readable storage medium and a computer program product. The computer readable storage medium and the computer program product include a computer instruction used to implement the solutions described in the embodiments of the present invention.

In the embodiments of the present invention, EC and multi-copy are used as striping algorithms. However, the striping algorithm in the embodiments of the present invention is not limited to EC or multi-copy.

In the several embodiments provided in the present invention, it should be understood that the disclosed apparatus and method may be implemented in other manners. For example, the unit division in the described apparatus embodiment is merely logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented electrically, mechanically, or in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A method for obtaining a storage system capacity in a redundant array of independent disks (RAID) storage system, wherein the RAID storage system comprises an available disk group ($DG_i$), a quantity of disks in the available $DG_i$ is $N_i$, a capacity of a disk $D_i$ in the available $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$, wherein i is an integer from 1 to G, G is an integer, G is not less than 2, x is an integer, and x is an integer from 1 to G−1, wherein a stripe length that can be configured in the storage system is [r, z], and wherein r and z are positive integers and z is greater than r, and the method comprises:

obtaining, by a processor of a management device, a candidate stripe length $LORIG_y$, wherein a value of y is an integer in the stripe length from r to z that can be configured, and $LORIG_y=y$;

shrinking, by the processor of the management device, a capacity of a part of the disks in the available $DG_i$, wherein the capacity of each disk is greater than $CD_G$, to obtain a remaining capacity by disabling a portion of the capacity of the part of the disks based on an estimated capacity of the RAID storage system exceeding an actual capacity of the RAID storage system, wherein the estimated capacity is based on the capacity of the part of the disks and the stripe length $LORIG_y$;

obtaining, by the processor of the management device, an available capacity of the storage system and that is based on the remaining capacity; and providing, by the processor of the management device, an application access to the available capacity for the purpose of storing data.

2. The method according to claim 1, further comprising:
grouping, by the processor of the management device, available disks in the storage system, to obtain G of the available $DG_i$; and
sorting, by the processor of the management device, the G of the available $DG_i$.

3. The method according to claim 1, further comprising:
determining, by the management device based on an available capacity that is of the storage system and that is associated with each stripe having a candidate stripe length from $LORIG_r$ to $LORIG_z$, a candidate stripe length $LORIG_P$ associated with a maximum value of available capacities of the storage system, wherein a value of P is an integer in r to z.

4. The method according to claim 1, further comprising configuring, by the processor of the management device, a stripe length of the storage system as the candidate stripe length $LORIG_P$.

5. The method according to claim 1, wherein obtaining, by the processor of the management device, the available capacity that is of the storage system and that is associated with a stripe having the candidate stripe length $LORIG_y$ comprises:
performing, by the processor of the management device, process a starting from t=1, wherein process a includes:
determining whether $$CD_i * LCU_y \leq \sum_{i=t}^{G} CDG_i$$

is met, wherein $CDG_i = CD_i * N_i$; and
when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and
when $$CD_i * LCU_y \leq \sum_{i=t}^{G} CDG_i$$

is met and t=1, performing process 2a;

when $$CD_i * LCU_y \leq \sum_{i=t}^{G} CDG_i$$

is met and t is greater than 1 and not greater than G, performing process 2b; or
when $$CD_i * LCU_y \leq \sum_{i=t}^{G} CDG_i$$

is not met and t is not greater than G, performing process 2c, wherein process 2a includes obtaining the available capacity that is of the storage system and that is associated with the stripe having the candidate stripe length $LORIG_y$ as $$\left(\sum_{i=1}^{G} CDG_i\right) * V / LORIG_y,$$

wherein V is a quantity of data strips in the stripe;
wherein process 2b includes obtaining the available capacity that is of the storage system and that is associated with the stripe having the candidate stripe length $LORIG_y$ as $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y;$$

and
wherein process 2c includes assigning t+1 to t, and performing process a, wherein t is not greater than G.

6. The method according to claim 1, wherein obtaining, by the processor of the management device, the available capacity that is of the storage system and that is associated with a stripe having the candidate stripe length $LORIG_y$ comprises:
performing, by the management device, process a starting from t=1, wherein process a includes:
determining whether $$CD_i * LCU_y \leq \sum_{i=t}^{G} CDG_i$$

is met, wherein $CDG_i = CD_i * N_i$; and
when t=1, $LORIG_y$ is equal to $LCU_y$; or
when t is not equal to 1, $LCU_y$ is equal to $$LORIG_y - \sum_{i=1}^{t-1} N_i,$$

and t represents a minimum value of a currently available disk group sequence; and
when $$CD_i * LCU_y \leq \sum_{i=t}^{G} CDG_i$$

is met and t=1, performing process 2a;
when $$CD_i * LCU_y \leq \sum_{i=t}^{G} CDG_i$$

is met and t is greater than 1 and not greater than G, performing process 2b; or
when $$CD_i * LCU_y \leq \sum_{i=t}^{G} CDG_i$$

is not met and t is not greater than G, performing process 2c,
wherein process 2a includes obtaining the available capacity that is of the storage system and that is associated with the stripe having the candidate stripe length $LORIG_y$ as $$\sum_{i=t}^{G} CDG_i;$$

wherein process 2b includes obtaining the available capacity that is of the storage system and that is associated with the stripe having the candidate stripe length $LORIG_y$ as $$\left(\left(\sum_{i=t}^{G} CDG_i\right)/LCU_y\right) * \left(\sum_{i=1}^{t} N_i\right) + \sum_{i=t}^{G} CDG_i;$$

and
wherein process 2c includes: assigning t+1 to t, and performing process a, wherein t is not greater than G.

7. The method according to claim 5, wherein the storage system further comprises a hot spare disk, a capacity of the hot spare disk is PC, and an available capacity of the hot spare disk is $$PC + \sum_{i=1}^{G} CDG_i - \left(\left(\sum_{i=t}^{G} CDG_i\right)/LCU_y\right) * \left(\sum_{i=1}^{t} N_i\right) + \sum_{i=t}^{G} CDG_i\right).$$

8. The method according to claim 1, wherein the stripe whose stripe length [r, z] that can be configured in the storage system is a stripe using an erasure coding algorithm.

9. The method according to claim 1, wherein the stripe whose stripe length that can be configured in the storage system is [r, z] is a stripe using a multi-copy algorithm.

10. A storage system comprising:
a management device and a quantity of disks in $N_i$ an available disk group ($DG_i$),
wherein, a capacity of a disk $D_i$ in the available $DG_i$ is $CD_i$, and a capacity $CD_x$ of a disk $D_x$ in a $DG_x$ is greater than a capacity $CD_{x+1}$ of a disk $D_{x+1}$ in a $DG_{x+1}$,
wherein i is an integer from 1 to G, G is an integer, G is not less than 2, x is an integer, and x is an integer from 1 to G-1,
wherein a stripe length that can be configured in the storage system is [r, z], and
wherein r and z are positive integers and z is greater than r; and
the management device comprising a processor and an interface, the processor communicating with the interface and the processor is configured to:
obtain a candidate stripe length $LORIG_y$, wherein a value of y is an integer in the stripe length from r to z that can be configured, and $LORIG_y=y$;
shrink a capacity of a part of the disks in the available $DG_i$, wherein the capacity of each disk is greater than $CD_G$, to obtain a remaining capacity by disabling a portion of the capacity of the part of the disks;
obtain an available capacity of the storage system and that is based on the remaining capacity; and
provide an application access to the available capacity for the purpose of storing data.

11. The storage system according to claim 10, wherein the processor is further configured to group available disks in the storage system, to obtain G of the available $DG_i$ and sort the G available $DG_i$.

12. The storage system according to claim 10, wherein the processor is further configured to determine, based on an available capacity that is of the storage system and that corresponds to a stripe having a candidate stripe length from $LORIG_r$ to $LORIG_z$, a candidate stripe length $LORIG_P$ associated with a maximum value of available capacities of the storage system, wherein a value of P is an integer in r to z.

13. The storage system according to claim 11, wherein the processor is further configured to configure a stripe length of the storage system as the candidate stripe length $LORIG_P$.

14. The storage system according to claim 10, wherein the processor is configured to:
perform process a starting from t=1, wherein process a includes:
determining whether $$CD_i * LCU_y \leq \sum_{i=t}^{G} CDG_i$$

is met, wherein $CDG_i=CD_i*N_i$; and
when t=1, $LORIG_y$ is equal to $LCU_y$; or
when t is not equal to 1, $LCU_y$ is equal to $$LORIG_y - \sum_{i=1}^{t-1} N_i,$$

and t represents a minimum value of a currently available disk group sequence; and when $$CD_i * LCU_y \leq \sum_{i=t}^{G} CDG_i$$

is met and t=1, the processor is further configured to perform process 2a;
when $$CD_i * LCU_y \leq \sum_{i=t}^{G} CDG_i$$

is met and t is greater than 1 and not greater than G, the processor is further configured to perform process 2b; or
when $$CD_i * LCU_y \leq \sum_{i=t}^{G} CDG_i$$

is not met and t is not greater than G, the processor is further configured to perform process 2c,
wherein process 2a includes obtaining the available capacity that is of the storage system and that is associated with the stripe having the candidate stripe length $LORIG_y$ as $$\left(\sum_{i=1}^{G} CDG_i\right) * V / LORIG_y,$$

wherein V is a quantity of data strips in the stripe,
wherein process 2b includes obtaining the available capacity that is of the storage system and that is associated with the stripe having the candidate stripe length $LORIG_y$ as $$\left(\left(\left(\sum_{i=t}^{G} CDG_i\right) / LCU_y\right) * \left(\sum_{i=1}^{t} N_i\right) + \sum_{i=t}^{G} CDG_i\right) * V / LORIG_y,$$

and
wherein process 2c includes assigning t+1 to t, and performing process a, wherein t is not greater than G.

15. The storage system according to claim 10, wherein the processor is configured to:
perform process a starting from t=1, wherein process a includes determining whether $$CD_i * LCU_y \leq \sum_{i=t}^{G} CDG_i$$

is met, wherein $CDG_i = CD_i * N_i$; and
when t=1, $LORIG_y$ is equal to $LCU_y$; or when t is not equal to 1, $LCU_y$ is equal to $$LORIG_y - \sum_{i=1}^{t-1} N_i,$$

and t represents a minimum value of a currently available disk group sequence; and
when $$CD_i * LCU_y \leq \sum_{i=t}^{G} CDG_i$$

is met and t=1, the processor is further configured to perform process 2a;
when $$CD_i * LCU_y \leq \sum_{i=t}^{G} CDG_i$$

is met and t is greater than 1 and not greater than G, the processor is further configured to perform process 2b; or
when $$CD_i * LCU_y \leq \sum_{i=t}^{G} CDG_i$$

is not met and t is not greater than G, the processor is further configured to perform process 2c,
wherein process 2a includes obtaining the available capacity that is of the storage system and that corresponds to the stripe having the candidate stripe length $LORIG_y$ as $$\sum_{i=1}^{G} CDG_i,$$

wherein process 2b includes obtaining the available capacity that is of the storage system and that corresponds to the stripe having the candidate stripe length $LORIG_y$ as $$\left(\left(\sum_{i=t}^{G} CDG_i\right) / LCU_y\right) * \left(\sum_{i=1}^{t} N_i\right) + \sum_{i=t}^{G} CDG_i,$$

and
wherein process 2c includes assigning t+1 to t, and performing process a, wherein t is not greater than G.

16. The storage system according to claim 14, wherein the storage system further comprises a hot spare disk, a capacity of the hot spare disk is PC, and an available capacity of the hot spare disk is $$PC + \sum_{i=1}^{G} CDG_i - \left(\left(\left(\sum_{i=t}^{G} CDG_i\right) \Big/ LCU_y\right) * \left(\sum_{i=1}^{t} N_i\right) + \sum_{i=t}^{G} CDG_i\right).$$

17. The storage system according to claim 10, wherein the stripe whose stripe length [r, z] can be configured in the storage system is a stripe using an erasure coding algorithm.

18. The storage system according to claim 10, wherein the stripe whose stripe length [r, z] that can be configured in the storage system is a stripe using a multi-copy algorithm.

* * * * *